United States Patent [19]

Peterman et al.

[11] Patent Number: 4,635,678
[45] Date of Patent: Jan. 13, 1987

[54] FLOW CONTROL APPARATUS

[75] Inventors: Charles P. Peterman; Julian D. Keithahn, both of Houston, Tex.

[73] Assignee: Hydril Company, Los Angeles, Calif.

[21] Appl. No.: 691,995

[22] Filed: Jan. 16, 1985

[51] Int. Cl.$^4$ .................... F16K 1/36; F16K 31/528
[52] U.S. Cl. .................. 137/551; 137/625.38; 251/260
[58] Field of Search ............ 137/625.38, 625.37, 137/551; 251/260

[56] References Cited

U.S. PATENT DOCUMENTS

| 1,859,357 | 5/1932 | Elder | 137/551 X |
|---|---|---|---|
| 3,182,446 | 5/1965 | Kaminski | 251/260 X |
| 3,605,787 | •9/1971 | Krogfoss et al. | 137/625.38 X |
| 3,767,164 | 10/1973 | Robinson | 251/368 X |
| 4,444,222 | 4/1984 | Yamagiwa | 137/625.38 X |
| 4,508,138 | 4/1985 | Dixon | 137/625.38 X |

FOREIGN PATENT DOCUMENTS 559165 6/1923 France ............... 137/625.38

Primary Examiner—Arnold Rosenthal
Attorney, Agent, or Firm—Dodge, Bush & Moseley

[57] ABSTRACT

A flow control apparatus having a valve body forming a longitudinal axis with an inlet and an outlet connected by flow passage that are all substantially disposed on the longitudinal axis to provide a straight flow path is disclosed. A moveable flow control sleeve is concentrically disposed about a cylindrical seat member fixed in the valve body. Radially opposed ports are disposed in the seat member. A quick acting 90 degree rotatable stem is operably connected to the flow control sleeve to reciprocate the sleeve axially along the cylindrical seat to and from the open and closed position to regulate the fluid flowing through the opposed ports and valve apparatus. A flowmeter sensor is mounted with the valve body for providing a signal in response to the rate of flow through the flow passage. The signal is usable by a flow rate determining system which may be connected to a valve actuator for automatically operating the valve in response to certain prearranged flow conditions.

13 Claims, 3 Drawing Figures

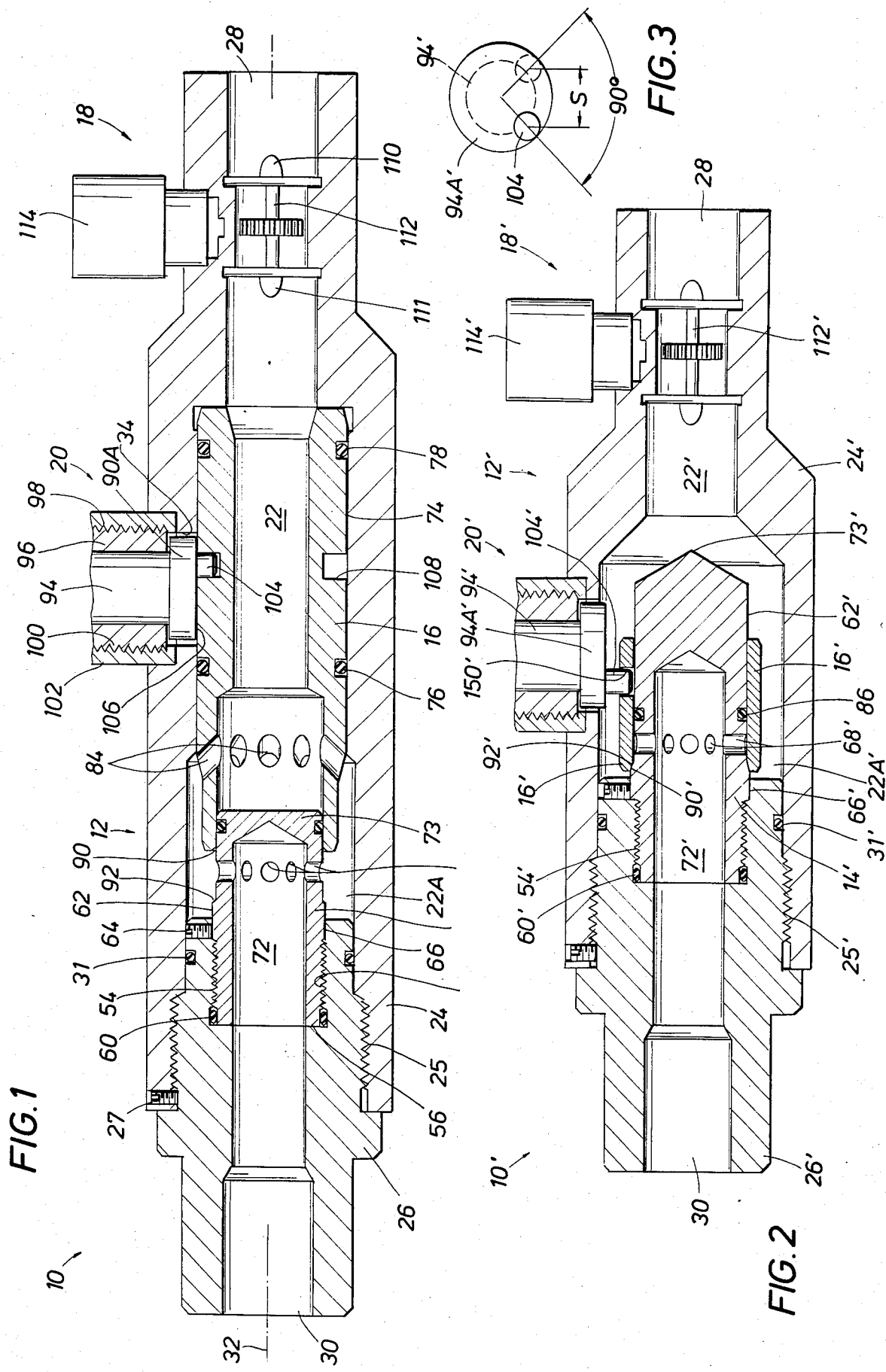

FLOW CONTROL APPARATUS

BACKGROUND OF THE INVENTION

1. Field of the Invention

The present invention relates to a flow control apparatus and more particularly, to an inline flow control valve apparatus having a flow sensor for a flowmeter system.

2. Description of the Prior Art

Canadian Pat. No. 1,101,823 to Eugene O. Lee is entitled "Erosion Control Trim for a Control Valve". The disclosed "choke" valve includes a T-shaped angled flow valve body in which the valve stem is axially aligned with the outlet and is operably connected to a reciprocating flow control sleeve element. A cylindrical valve seat forms a sidewall having a plurality of oppositely disposed ports radially spaced is sealingly secured adjacent the valve outlet. The desired flow is inwardly through the ports to direct the flow to impinge upon itself at the center of the valve seat to reduce seat erosion. The cylindrically shaped reciprocating sleeve valve is concentrically disposed about the outer cylindrical sidewall to control or regulate the inwardly flow through the ports.

French Pat. No. 1,186,275 by Bourquin et al discloses a flow control valve having a movable sleeve valve member concentrically disposed about a fixed seat member having a plurality of radially disposed ports for directing the flow inwardly to impinge upon itself. The valve outlet is disposed at a right angle to the inlet.

U.S. Pat. No. 4,132,386 to Lee also discloses a choke valve mechanism having an angled or T-shaped valve body to position the inlet and outlet at right angles. A tubular valve seat having a central flow port and an outer sidewall having a conical portion adjacent to its top portion and a cylindrical lower portion is secured with the valve body adjacent the outlet. A closed end sleeve valve member is operably connected to a valve stem for effecting the desired operating movement of the sleeve. In the closed position, the sleeve is adapted to sealingly engage around the outer cylindrical sidewall of the seat member and may be spaced from the outer sidewall of the seat member to enable controlled flow through the central opening of the tubular seat.

U.S. Pat. No. 3,921,672 to Arnold discloses a flow choke or restriction designed for providing a predetermined pressure drop to the fluid flow. The tubular choke has a closed end and is provided with a plurality of radially spaced oppositely disposed orifices or ports for inwardly impinging the flow to minimize choke erosion. The total flow area through the parts determines the pressure drop.

U.S. Pat. No. 2,927,767 to Ray discloses a valve seal construction particularly suitable for high velocity fluid flow having an axially aligned inlet and outlet. A movable poppet disposed orthogonal to the inlet and outlet controls flow through the valve which is provided with a protected soft seat.

U.S. Pat. No. 2,782,800 to Hillebrand discloses a faucet having a movable sleeve closure member with radially disposed ports formed therein.

U.S. Pat. No. 1,954,044 to Guildford discloses a modified form of a conventional globe valve having a movable tubular closure element and a protected soft seat.

U.S. Pat. No. 4,111,229 to Christian discloses a ball valve having a flow regulating choke disposed in the ball closure element flow port. The flow regulatory choke is a multiple orifice valve similar to that disclosed in U.S. Pat. No. 3,207,181 or U.S. Pat. No. 3,426,797.

U.S. Pat. No. 4,226,263 to Muchow also discloses a ball valve including a movable erosion control trim flow regulating choke disposed in the rotatable ball element flow port. The ball element is used to close off or shut-in the flow while the sliding choke is extended from the ball element to enable controlled flow when the ball element is rotated open. Both the Muchow and Christian valves required a complex and expensive dual operator mechanism for operating the flow regulating choke and ball.

A compact fast acting inline valve having a substantially straight through flow path and an erosion control trim is disclosed in co-pending patent application Ser. No. 763,547, filed Aug. 8, 1985, to John D. Muchow. The assignee of the Muchow patent application, Hydril Company, is the same assignee of the present invention.

Some of the prior conventional flow measuring systems or instrumentation is disclosed in the Hydril Company bulletin 5126-A entitled "Selection and Application of Flow Measurement Instrumentation", 91 pages, dated August, 1983. The conventional flow measurement sensor instrumentation includes, but is not limited to, the following; positive displacement flowmeters, differential pressure flowmeters, turbine or propeller type flowmeters, vortex shedding flowmeters, fluidic flowmeters, electro-magnetic flowmeters, target flowmeters, variable area flowmeters, ultrasonic flowmeters and thermal flow flowmeters.

All of the above-identified patents, patent application and publication are hereby fully incorporated herein as written description by this specific reference for any and all purposes as completely as if such patents, patent application and publication were set forth verbatim herein.

In addition to the previously selected and identified patents, Applicant's assignee is also the owner of numerous additional patents and patent applications disclosing valves, flowmeters and components therefore. Many other inventors have also been active in developing this useful technology as have been considered above. It is to be understood that other patents not mentioned herein may be as equally relevant as prior art to those that are mentioned, but that best efforts have been made to identify and consider the best prior art.

IDENTIFICATION OF THE OBJECTS OF THE INVENTION

In view of the foregoing factors and conditions characteristic of the prior art, it is an object of the present invention to provide a flow control apparatus having a substantially straight flow path in which is disposed a flowmeter sensor and a flow control valve.

It is another object of this invention to provide a flow control apparatus having a body with an inlet and an outlet axially aligned and mounting a flow control valve which minimizes flow erosion damage and a flowmeter sensor for metering the flow of fluid through the apparatus.

It is a further object of the present invention to provide a flow control apparatus having both a rapid valve operating means for moving the flow control sleeve to open and close the valve and a flow meter sensor mounted with the apparatus.

It is a further object of the present invention to provide a flow control apparatus adapted for controlling and sensing a flow of fluid in a conduit which is low in cost, simple to manufacture, and reliable in operation.

SUMMARY OF THE INVENTION

A flow control apparatus having a valve body forming a longitudinal axis with an inlet and an outlet connected by flow passage that are all substantially disposed on the longitudinal axis to provide a straight flow path is disclosed. A moveable flow control sleeve valve closure element is concentrically disposed about a cylindrical seat member fixed in the valve body. Radially opposed ports are disposed in the seat member to provide an erosion control trim. A quick acting 90 degree rotatable stem is operably connected to the flow control sleeve to reciprocate the sleeve axially along the cylindrical seat to and from the open and closed position to control the fluid flowing through the opposed ports and valve apparatus. A flowmeter sensor is mounted with the valve body for providing an output signal in response to the rate of flow through the flow passage that is usable by a flow rate determining system.

DESCRIPTION OF THE DRAWINGS

The objects, advantages, and features of the invention will become more apparent by reference to the drawings which are appended hereto and wherein like numerals indicate like parts and wherein an illustrated embodiment of the invention is shown, of which:

FIG. 1 is a vertical sectional view of the flow control apparatus of the present invention in the open position;

FIG. 2 is a vertical sectional view of an alternative embodiment of the flow control apparatus of the present invention in the closed position; and FIG. 3 is a horizontal sectional view taken along line 3—3 of FIG. 1 illustrating the means for moving the flow control sleeve.

DETAILED DESCRIPTION OF THE PREFERRED EMBODIMENT

The flow control apparatus, generally designated 10, embodying the present invention is illustrated in FIGS. 1-3. The flow control apparatus includes a valve body, generally designated 12, a fixed cylindrical port or seat member 14, a moveable flow control closure sleeve 16, a flow sensor means, generally designated 18, and a means for moving the flow control closure sleeve, generally designated 20.

The substantially tubular valve housing or body 12, illustrated in FIG. 1, is formed by an inlet sleeve portion 24 and an outlet sleeve portion 26 secured by threaded engagement at 25. To prevent inadvertent disengagement of the threads at 25, a suitable threaded anti-rotation pin 27 may be utilized. An O-ring 31 prevents leakage of fluid along threads 25 to contain the fluid under pressure within flow passage 22 in the usual manner. The valve body 12 forms a substantially straight through flow passage 22 communicating axially aligned circular flow inlet opening 28 with flow outlet opening 30 along the longitudinal axis 32 of the valve body 12. The inlet portion 24 and the outlet portion 26 of the valve body 12, in the preferred embodiment, are welded to the flow conduit (not illustrated) for forming a straight portion thereof in the conventional manner, though other means of connecting may be used on the valve body 12 if desired. The resulting flow passage 22 is cylindrical in cross-section and is concentric about the longitudinal axis 32.

The cylindrical valve seat or port member 14 is fixedly secured in the outlet portion 26 of the valve body 12 for directing the flow through the flow passage 22 of the valve body. The seat member 14 has outwardly facing threads 54 disposed adjacent a second end 56 which threadedly engage inwardly facing or box threads 58 in the outlet body portion 26 to concentrically position and secure the cylindrical seat member 14 about the longitudinal axis 32 of the valve body 12. An O-ring 60 is disposed adjacent threads 50 to seal between the seat member 14 with the outlet portion 26 for blocking leakage of fluid therebetween. An anti-rotation threaded pin or fastener 64 is preferably employed to prevent inadvertent rotation of seat member 14 and disengagement from helical thread 58 during use. The cylindrical seat member 14, preferably fabricated from tungsten carbide, stainless steel or stellite to enhance resistance to flow erosion, has an outer cylindrical surface 62 having a plurality of radially opposed ports 68 disposed in a circumferentially spaced relationship. By directing the flow radially inwardly through the diametrically opposed ports 68 the fluid flow energy impinges on the opposite inwardly flow to minimize erosion of the seat 14. The area of opening of the ports 68 are properly sized to achieve the desired pressure drop for the flow rate operating range for the flow control apparatus 10. The seat member 14 has a central flow cavity 72 communicating with the outlet 30 of the flow passage 22 and a closed upsteam or first end 73 to thereby insure inwardly flow through ports 68.

The moveable flow control element or sleeve 16 is concentrically disposed about the fixed cylindrical seat member 14 and is reciprocally moveable longitudinally relative to the seat member 14 between a closed position (not shown) for blocking the radially inwardly flow of fluid through the ports 68 and an open position (FIG. 1) for enabling the desired flow of fluid radially inwardly through the ports 68. The sleeve 16 has an outer cylindrical surface 74 with O-rings 76 and 78 located in annular grooves 80 and 82, respectively, which continuously seal the moveable sleeve 16 with the inlet portion 24. The longitudinally spaced O-rings 76 and 78 seal on the same diameter to provide a substantially fluid pressure balanced sleeve 16 for ease of operation of the flow control apparatus 10. The O-rings 76 and 78 also isolate the fluid in the flow passage 22 from the aperture 34 formed in the housing portion 24.

The flow control sleeve 16 has a plurality of angular flow bypass openings 84 radially disposed in the sleeve 16 to communicate flow from the inlet 28 and the flow passage 22 to the annulus shaped flow passage portion 22A disposed adjacent and exteriorly of the ports 68 in the cylindrical seat member 14. In the preferred embodiment, the openings 84 are substantially larger than ports 68 and are inclined forty-five degrees towards the outlet 30 from the longitudinal axis 32. The larger opening ports 68 reduce flow velocity to minimize flow turbulence and possible erosion resulting from impingement on the valve body 12.

An O-ring or seal 86 forms a continuous sliding first seal between the fixed cylindrical seat member 14 and the moveable flow control sleeve 16 adjacent the second end 73 to block leakage of fluid therebetween. The O-ring 86 is carried in an annular external groove 88 disposed between the plurality of ports 68 and the closed first end 70 of the seat member 14.

A tapered annular inclined stop and seal shoulder 90 is formed on the movable sleeve 16 for engaging a tapered complimentary annular shoulder 92 formed on the fixed cylindrical seat member 14 to form a second metal-to-metal seal when the sleeve 16 is moved toward the outlet 30 to the closed position for blocking inwardly flow of fluids through the ports 68. The fixed annular seal shoulder 92, in the preferred embodiment, is formed by a slightly larger diameter (0.03 inches) outer surface 66 adjacent threads 54.

The means for moving 20 or valve operator comprises a rotatable stem 94 having a stem retainer or housing 96 disposed concentrically therearound. The cylindrical stem 94 has a lower enlarged diameter cylindrical portion 94A located in the circular aperture 34 of the inlet portion 24 of the valve body 12. The stem housing 96 has outwardly facing threads 98 thereon which threadedly engage inwardly facing threads 100 of outer stem housing 102 which is attached to the valve body 12 to secure stem 94 with the valve body 12 while enabling operating rotation of the stem 94. An elongated operating handle (not illustrated) may be mechanically coupled to the stem 94 for rotation of the stem 94 as desired in the conventional manner and as disclosed in previously mentioned co-pending patent application Ser. No. 763,547, filed Aug. 8, 1985 to John D. Muchow.

A cam lug 104, as shown in FIGS. 1 and 3, is eccentrically disposed on the downwardly facing surface 106 of the lower stem portion 94a and is operably disposed in an annular groove 108 formed in the outer cylindrical surface 74 of sleeve 16 between O-ring seals 76 and 78. As discussed previously the O-rings 76 and 78 serve to seal the flow passage 22 from both the aperture 34 and the stem 94. Preferably, upon 90° arc of rotation of the stem 94 circumferentially relative to the housing 96 the flow control sleeve 16 reciprocates axially a longitudinal distance S (FIG. 3) between the open and closed positions. Conventional quarter turn or ninety (90) degree valve operators or actuators (not illustrated) may be employed and which is the preferred embodiment for that reason. However, a one hundred eighty (180) degree arc of rotation of the stem 94 to operate the sleeve 16 may be utilized by those skilled in the art if desired.

The flow sensor means 18 is preferably mounted in the inlet portion 24 of the valve body 12 and provides an output signal in response to the rate of flow through the inlet 28 of the flow passage 22. The signal provided by the flow sensor means 18 is usable by a conventional flow rate determining system. Such a system may be connected using a closed loop automatic control system with a conventional automatic valve operator mounted with the stem 94 for actuating the sleeve 16 between the open or closed position upon prearranged flow conditions.

In the preferred embodiment, a turbine flow meter having a pair of fixed bearing assemblies 110 and 111 concentrically disposed along the longitudinal axis 32. A free running magnetic turbine rotor 112 is supported on the rigid bearing assembly 110 for rotation in response to fluid flow past the rotor 112. The greater the flow rate the faster the rotor 112 rotates in response to the flow. A variable reluctance pickup disposed in housing 114 magnetically measures the movement of the rotor 112 and provides an electrical output signal indictative of the flow rate that is usable by the electrical connected flow metering system.

An alternative embodiment of the present invention is disclosed in FIG. 2 using corresponding reference characters denoted in prime to indicate like parts. The flow control apparatus 10' includes a valve body 12', a fixed cylindrical seat member 14', a movable flow control sleeve 16', a flow sensor means 18', and the valve operator means for moving 20' the flow control sleeve 16' to and from the flow enabling and the flow blocking positions to regulate the fluid flowing through the flow control apparatus 10'.

The substantially tubular valve body 12' comprises an inlet portion 24' and an outlet portion 26' forming a substantially straight through flow passage 22' communicating a flow inlet opening 28' with a flow outlet opening 30'. The threaded arrangement for securing the fixed cylindrical seat member 14' with the outlet portion 26' and for assembling the outlet body portion 26' with the inlet portion 24' are substantially similar to that disclosed in FIG. 1.

The seat member 14' has an outer cylindrical surface having a plurality of radially opposed flow ports 68' disposed in a circumferentially spaced relationship to provide the mutually impinging flow with the seat 14'. The seat member 14' has a cone shaped closed first end 73' to aid in directing the flow of fluid from the inlet 28' to the annulus shaped flow passage portion 22A' disposed adjacent and outwardly of the ports 68' in the cylindrical seat member 14'.

As shown in FIG. 2, a major distinction is in the simplified construction of movable flow control element or sleeve 16' which operates in the same reciprocating manner to perform the same opening and closing function of the embodiment of FIG. 1. The sleeve 16' is concentrically disposed about the seat member 14' and is reciprocally moveable longitudinally relative to the seat member 14' between a closed position as shown in FIG. 2 for blocking the radially inwardly flow of fluid through the ports 68' and an open position (not shown) for enabling the flow of fluid radially inwardly through the ports 68'.

The sleeve 16' is substantially pressured balanced for ease of operation being sealed continuously by O-ring 86' The tapered annular shoulder 90' formed on the moveable sleeve 16' engages a complimentary shoulder 92' formed on the fixed seat member 14' to form a second seal when the sleeve 16' is moved to the closed position (FIG. 2) where the two seals cooperated to block flow of fluids through the ports 68'. The annular seal shoulder 92' is formed by a slightly larger diameter (0.03 inches) outer cylindrical surface 66' on the second end 56' outer cylindrical surface 62' than at ports 68' or the first end 70'.

A rotatable stem 94', similar in construction and assembly to the embodiment of FIG. 1 is used to reciprocate the sleeve 16'. The stem 94' is provided with conventional O-ring seals (not shown) in order to block leakage from the flow passage 22' as sleeve 16' is not sealed to the valve body 12'. The eccentric cam lug 104' carried the lower enlarged stem portion 94A' is operably disposed in an opening 150' formed in the sleeve 16'. Conventional quarter turn (90°) valve actuators or 180° turn actuators may also be employed with the embodiment of FIG. 2.

The flow sensor means 18' which is mounted in the inlet portion 24' of the valve body 12' provides an output signal in response to the rate of flow through the flow passage 22' in the conventional manner. The output signal provided by the sensor means 18' is usable by a known flow rate determining system which may be operably connected in an automatic closed loop valve controller having a valve operator connected with the stem 94' for automatically operating the sleeve 16' between the open or closed positions.

Various modification and alterations in the described structures will be apparent to those skilled in the art of the foregoing description which does not depart from the spirit of the invention. For this reason, these changes are desired to be included in the appended claims. The appended claims recite only the limitation to the present invention in the descriptive manner which is employed for setting forth the embodiments and is to be interpreted as illustrative and not limitative.

What is claimed is:

1. Flow control apparatus adapted for controlling a flow of fluid in a conduit, comprising:
    a valve body having an inlet, an outlet and a flow passage communicating said inlet and outlet, each of said inlet and said outlet having means for connecting with said conduit to form a portion of the conduit, said valve body forming a longitudinal axis with said inlet and said outlet disposed on said longitudinal axis to form a substantially straight portion of the conduit;
    a cylindrical seat member fixedly secured in said valve body for directing flow through said flow passage of said valve body, said cylindrical seat member closed at a first end to form a central flow cavity communicating with said outlet, said cylindrical seat member having a plurality of radially opposed ports formed in said cylindrical seat member at a location spaced from said first end to direct the flow from said inlet radially inwardly through said opposed ports into said central flow cavity to impinge upon the opposed flow to minimize flow erosion of said cylindrical seat member;
    a movable flow control sleeve concentrically disposed about said cylindrical seat member and movable longitudinally relative to said seat member to and from a closed position for blocking radially inwardly flow of fluid through said ports and an open position for enabling flow of fluid radially inwardly through said ports;
    means for moving said flow control sleeve in said flow passage to and from the flow enabling and the flow blocking positions to regulate the fluid flowing through said flow passage;
    sensor means mounted with said valve body for providing an output signal in response to the rate of flow through said flow passage, the signal usable by a flow rate determining system to measure the flow through said flow passage;
    said movable flow control sleeve having a plurality of angular bypass openings radially disposed in said sleeve to communicate flow from said inlet to said flow passage adjacent said ports in said cylindrical seat member;
    an annular shoulder formed on said sleeve for engaging with said cylindrical seat member to form a second annular seal when said sleeve is moved to the closed position for blocking flow of fluids through said ports, said second seal disposed between said ports and a second end of said cylindrical seat member.

2. The apparatus as claimed in claim 1, wherein:
    said cylindrical seat member is concentric with said longitudinal axis of said valve body.

3. The apparatus as claimed in claim 1, wherein:
    said cylindrical seat member is fabricated from tungsten carbide, stainless steel, or stellite to resist flow erosion.

4. The apparatus as claimed in claim 1, further comprising:
    seal means for forming a continuous seal between said cylindrical seat member and said flow control sleeve to block leakage of fluid therebetween, said seal disposed between said ports and said first end of said seat member.

5. The apparatus as claimed in claim 4, wherein said seal means comprises:
    an annular external groove formed in said cylindrical seat member between said ports and said first end, and
    an annular resilient means disposed in said groove, said resilient means continuously contacting said movable sleeve to provide said continuous seal therebetween.

6. The apparatus as claimed in claim 1, wherein:
    said sleeve is substantially pressure balanced for ease of operation.

7. Flow control apparatus adapted for controlling a flow of fluid in a conduit, comprising:
    a valve body having an inlet, an outlet and a flow passage communicating said inlet and outlet, each of said inlet and said outlet having means for connecting with said conduit to form a portion of the conduit, said valve body forming a longitudinal axis with said inlet and said outlet disposed on said longitudinal axis to form a substantially straight portion of the conduit;
    a cylindrical seat member fixedly secured in said valve body for directing flow through said flow passage of said valve body, said cylindrical seat member closed at a first end to form a central flow cavity communicating with said outlet, said cylindrical seat member having a plurality of radially opposed ports formed in said cylindrical seat member at a location spaced from said first end to direct the flow from said inlet radially inwardly through said opposed ports into said central flow cavity to impinge upon the opposed flow to minimize flow erosion of said cylindrical seat member;
    a movable flow control sleeve concentrically disposed about said cylindrical seat member and movable longitudinally relative to said seat member to and from a closed position for blocking radially inwardly flow of fluid through said ports and an open position for enabling flow of fluid radially inwardly through said ports;
    means for moving said flow control sleeve in said flow passage to and from the flow enabling and the flow blocking positions to regulate the fluid flowing through said flow passage;
    sensor means mounted with said valve body for providing an output signal in response to the rate of flow through said flow passage, the signal usable by a flow rate determining system to measure the flow through said flow passage;
    said movable flow control sleeve having a plurality of angular bypass openings radially disposed in said sleeve to communicate flow from said inlet to said flow passage adjacent said ports in said cylindrical seat member;
    a rotatable stem operably connected with said movable flow control sleeve to reciprocate said sleeve axially to and from the open and closed positions when said stem is rotated.

8. The apparatus as claimed in claim 7, wherein said means for moving comprises:
  a cam lug eccentrically disposed on said stem;
  said sleeve having a substantially cylindrical outer surface, said outer surface having a slot therein;
  said cam lug operably engaged in said slot of said sleeve to reciprocate said sleeve axially to and from said open and said closed positions when said stem is rotated to move said cam lug.

9. The apparatus as claimed in claim 8, wherein:
  said slot is an annular groove formed in said outer surface.

10. The apparatus as claimed in claim 7, wherein: rotation of said stem circumferentially relative to said valve body through an arc substantially 90° moves said sleeve to and from the open and closed positions.

11. The apparatus as claimed in claim 1, wherein:
  said flowmeter sensor is disposed adjacent said inlet of said valve body to meter the flow of fluid through said flow passage.

12. The apparatus as claimed in claim 1, wherein said flowmeter sensor includes a turbine flowmeter disposed in said flow passage.

13. The apparatus as claimed in claim 12, wherein:
  said turbine flowmeter is disposed on said longitudinal axis to enable the flow of fluid through said flow passage.

* * * * *